United States Patent [19]

Kinder

[11] Patent Number: 5,235,720
[45] Date of Patent: Aug. 17, 1993

[54] WINDSHIELD WIPER ASSEMBLY WITH SCRUBBING BLADE

[75] Inventor: Larry L. Kinder, Sunnyvale, Calif.
[73] Assignee: Grant Products, Glendale, Calif.
[21] Appl. No.: 792,601
[22] Filed: Nov. 15, 1991
[51] Int. Cl.⁵ .............................. B60S 1/38; B60S 1/28
[52] U.S. Cl. .............................. 15/250.40; 15/250.41; 15/250.36; 15/250.42
[58] Field of Search .......... 15/250.41, 240.42, 250.40, 15/250.35, 250.36, 250.01–250.04

[56] References Cited

U.S. PATENT DOCUMENTS

| | | | |
|---|---|---|---|
| 2,051,668 | 8/1936 | Zaiger | 15/250.41 |
| 2,203,071 | 6/1940 | Zaiger | 15/250.41 |
| 2,908,028 | 10/1959 | Runton et al. | 15/250.40 |
| 3,021,548 | 2/1962 | Stoller | 15/250.36 |
| 3,059,265 | 10/1962 | Poland | 15/250.36 |
| 3,545,028 | 12/1970 | Poland | 15/250.36 |
| 3,828,388 | 2/1974 | Fuhr | 15/250.41 |
| 4,208,758 | 6/1980 | Timmis et al. | 15/250.04 |
| 4,327,457 | 5/1982 | Lunsford | 15/250.41 |
| 4,339,839 | 7/1982 | Knights | 15/250.41 |
| 4,649,593 | 3/1987 | Gilliam et al. | 15/250.41 |

FOREIGN PATENT DOCUMENTS

| | | | |
|---|---|---|---|
| 0327233 | 8/1989 | European Pat. Off. | 15/250.36 |
| 2639147 | 3/1978 | Fed. Rep. of Germany | 15/250.41 |
| 2700527 | 9/1978 | Fed. Rep. of Germany | 15/250.41 |
| 426562 | 4/1935 | United Kingdom | 15/250.04 |
| 1419345 | 12/1975 | United Kingdom | 15/250.41 |
| 2069326 | 8/1981 | United Kingdom | 15/250.42 |
| 2144976 | 3/1985 | United Kingdom | 15/250.42 |

Primary Examiner—Harvey C. Hornsby
Assistant Examiner—Gary K. Graham
Attorney, Agent, or Firm—Spensley Horn Jubas & Lubitz

[57] ABSTRACT

A windshield scrubbing and wiping blade assembly includes a scrubbing blade having a mesh covered scrubbing portion and at least one wiping blade in parallel, spaced apart relationship with the scrubbing blade. The mesh and the associated scrubbing portion of the scrubbing blade define side channels for receiving and transporting debris removed by the mesh from the windshield. In the two bladed embodiment of the invention, the scrubbing blade is shorter than the wiping blade whereby the scrubbing blade is maintained out of contact with the windshield during the portion of the wiping cycle in which the scrubbing blade trails the wiping blade. The mesh has edge margins which, in accordance with one embodiment, are beaded. The beads thus provided are received by and mechanically locked within longitudinally extending bores formed in the scrubber blade thereby avoiding the use of adhesives for securing the mesh to the scrubbing blade.

19 Claims, 5 Drawing Sheets

WINDSHIELD WIPER ASSEMBLY WITH SCRUBBING BLADE

FIELD OF THE INVENTION

The present invention relates generally to an improved windshield wiper assembly including the combination of a cleaning or scrubbing blade and at least one wiping blade.

BACKGROUND OF THE INVENTION

Windshield wiper blade assemblies combining windshield scrubbing and wiping functions are well known. Such blade assembles are designed to remove road grime, insect debris, light frost and the like from the windshield of a motor vehicle such as an automobile or truck. For example, U.S. Pat. No. 4,639,593 discloses a wiper assembly including at least one wiping or squeegee blade of generally standard configuration and a scrubbing element in the form of a mesh covered, flexible tubular member formed integrally with the wiping blade as a one piece extrusion. The mesh may be secured to the surface of the tubular member in various ways, for example, by adhesive bonding.

Combined scrubbing and wiping blade assemblies of the prior art have several drawbacks. For example, there is a tendency for these blade assemblies to leave streaks on the windshield. This is a result, in part, of the wiping blade lifting off he windshield surface during a portion of the windshield wiper cycle. Further, where adhesives are used to bond the mesh to an underlying support surface, the adhesive eventually dissolves as a result of the action of windshield wiper fluid additives. Still further, debris from the windshield surface tends to accumulate in and clog the interstices or openings of the mesh and there is no provision for the removal of the debris therefrom.

Accordingly, it is an overall object of the present invention to provide an improved windshield wiper assembly having a scrubbing blade and at least one wiping blade for efficiently removing debris from a windshield.

It is another object of the present invention to provide a windshield wiper assembly including a scrubbing element capable of removing debris from a windshield without leaving streaks.

It is yet another object of the present invention to provide an improved windshield wiper assembly including a mesh covered scrubbing element in which the mesh is secured in such a way that it is impervious to windshield wiper fluids and the like.

It is still a further object of the present invention to provide an improved windshield scrubbing and wiping assembly which provides for the removal of debris from the scrubbing element and thus effectively eliminates the accumulation of such debris in the interstices of the mesh.

SUMMARY OF THE INVENTION

In accordance with the broad aspects of the present invention, there is provided a windshield scrubbing and wiping blade assembly including a blade support adapted to be connected to a standard windshield wiper arm. The blade support carries a scrubbing blade and at least one wiping blade in parallel, spaced apart relationship. The transverse cross sectional configuration of the wiping blade is preferably that of a standard, commercially available blade or "refill", including a wiping portion having a base, a relatively narrow tip projecting from the base and side surfaces converging toward the tip. The scrubbing blade includes a scrubbing portion whose cross sectional shape may be similar to that of the wiping portion of the wiping blade. The scrubbing portion of the scrubbing blade is enveloped with a mesh having edge margins secured to the blade. The mesh, the tip and the side surfaces of the scrubbing portion define a passage or channel for receiving and transporting, under the flushing action of windshield wiper fluid or the like, debris removed from the windshield by the mesh. In this fashion, the openings of the mesh are kept clear of the removed debris.

During operation of the improved wiper assembly of the present invention, the wiping blade is maintained in contact with the windshield at all times during the wiping cycle. In the embodiment of the invention having a single wiping blade, this is accomplished by providing a scrubbing blade whose height is less than that of the wiping blade. As a result, during the portion of the wiper arm cycle in which the scrubbing blade leads the wiping blade, both blades are in contact with the windshield surface, the trailing wiping blade clearing the windshield behind the scrubbing blade. On the other hand, when the wiping blade leads the scrubbing blade, the shorter scrubbing blade is out of contact with the surface of the windshield; in this fashion, streaking of the windshield is prevented.

In accordance with another, more specific aspect of the invention, the edge margins of the mesh may be adhesively secured within grooves defined by the base of the scrubbing portion of the blade and an adjacent flange. The bonded edge margins of the mesh are thus effectively protected from exposure to the dissolving action of windshield wiper fluids. Alternatively, the edge margins of the mesh may be beaded and the beads thus provided are received by and mechanically locked within longitudinally extending bores formed in the scrubber blade between the base of the scrubbing portion and the adjacent flange. The use of adhesives is thereby eliminated altogether.

BRIEF DESCRIPTION OF THE DRAWINGS

Further objects, advantages and features of the present invention will become apparent from the detailed description below when read in conjunction with the accompanying drawings in which.

DETAILED DESCRIPTION OF THE PREFERRED EMBODIMENTS

Figure 1:
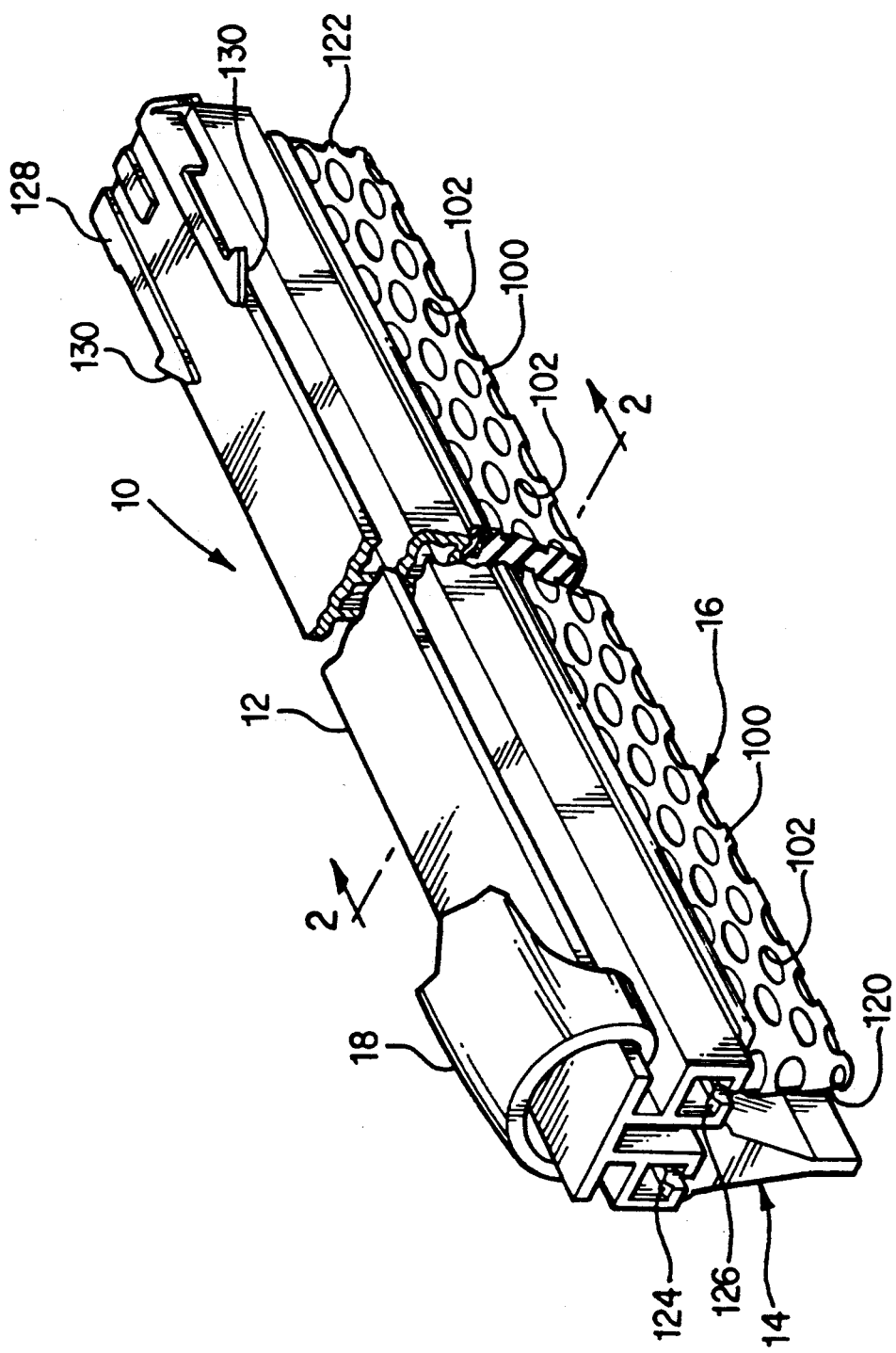
FIG. 1 is a perspective view of a windshield wiper assembly in accordance with a first embodiment of the invention.
Figure 2:
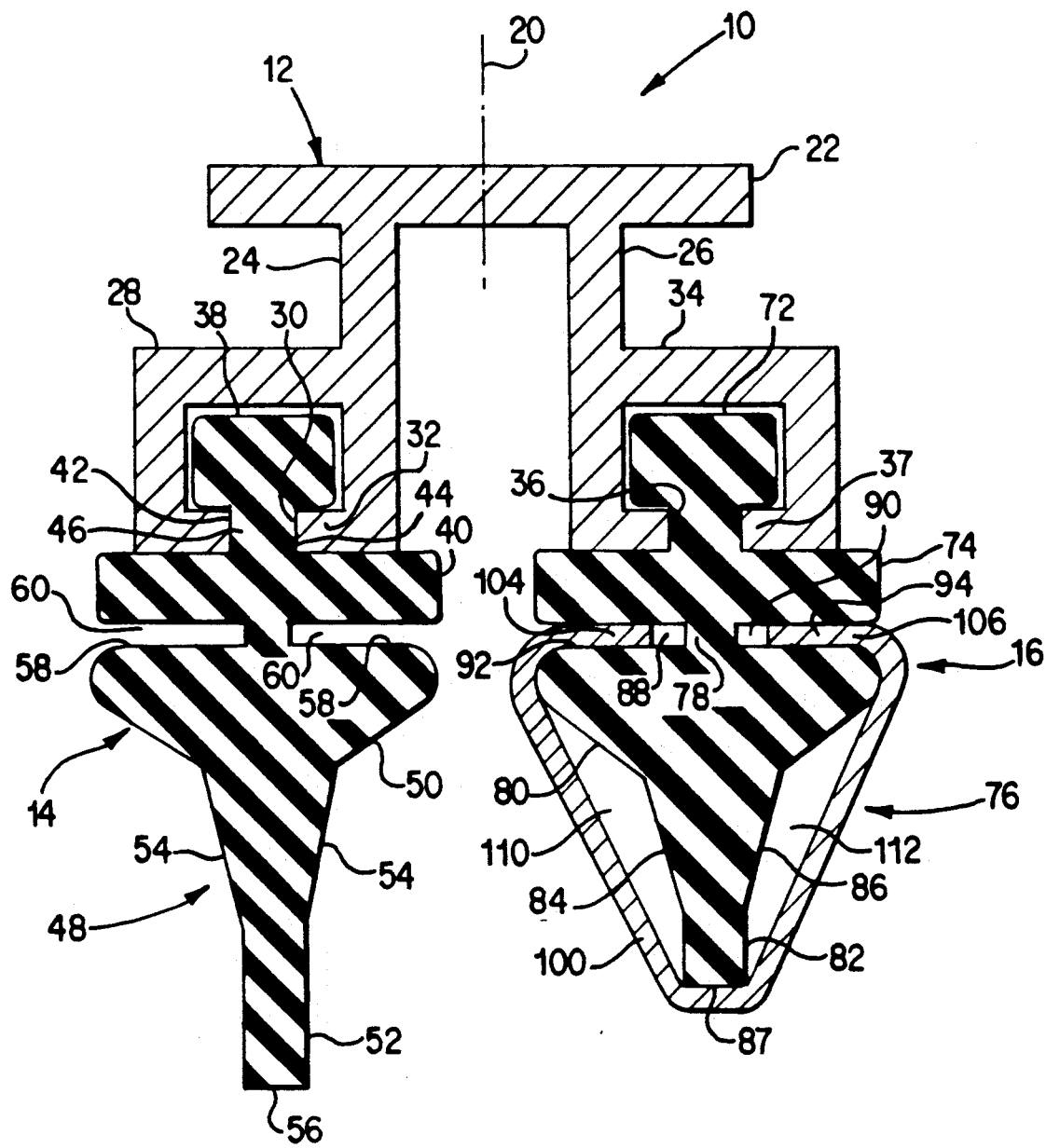
FIG. 2 is a typical transverse cross section of the embodiment of FIG. 1 as seen along 2—2 in FIG. 1.

Referring to FIGS. 1 and 2, there is shown a windshield cleaning and wiping blade assembly 10 in accordance with a first embodiment of the invention. The assembly 10 includes a blade support comprising a flexible backing 12 fabricated of plastic, light metal extrusion, rubber or the like, together with a wiping blade 14 and a cleaning or scrubbing blade 16 carried by the backing 12. The blade support 12 is adapted to be carried by a conventional oscillating wiper arm a portion 18 of which is shown in FIG. 1.

The blade support 12 is an elongated, extruded structure symmetrical in cross section (FIG. 2) about a vertical plane 20 and includes a horizontal flange 22 and a pair of spaced, parallel vertical webs 24 and 26 depending from the flange 22. The web 24 carries a generally rectangular channel 28 having a longitudinal slot 30 in a lower wall 32 thereof; a similar rectangular channel 34 having a slot 36 in a lower wall 37 is carried by the web 26.

The wiping blade 14 is a standard wiper "refill" element including a generally T-shaped attachment portion 38 received by the channel 28 and a bilaterally projecting flange 40 defining with the attachment portion 38 a pair of grooves 42 and 44 adapted to receive the slotted lower wall 32 of the channel 28.

Connected to the flange 40 by a web 46 is a wiping portion 48 of the blade 14. The wiping portion 48 generally includes a relatively wide base 50, a relatively narrow tip 52 projecting from the base 50 and tapering side walls 54 connecting the base and tip. The tip 52 has a flat extremity 56. The base 50 of the wiping portion 48 has bilateral shoulder surfaces 58 confronting the flange 40; accordingly, the surfaces 58 and flange 40 define between them slots 60. As is well known, this configuration provides flexibility allowing the wiping portion of the blade to pivot to some extent about the web to enhance the wiping action of the blade.

The scrubbing blade 16, in accordance with the first embodiment, includes a blade element that is generally similar to the standard blade 14 except that the height of the blade element is less than that of the blade 14 as best seen in FIG. 2.

Figure 3:
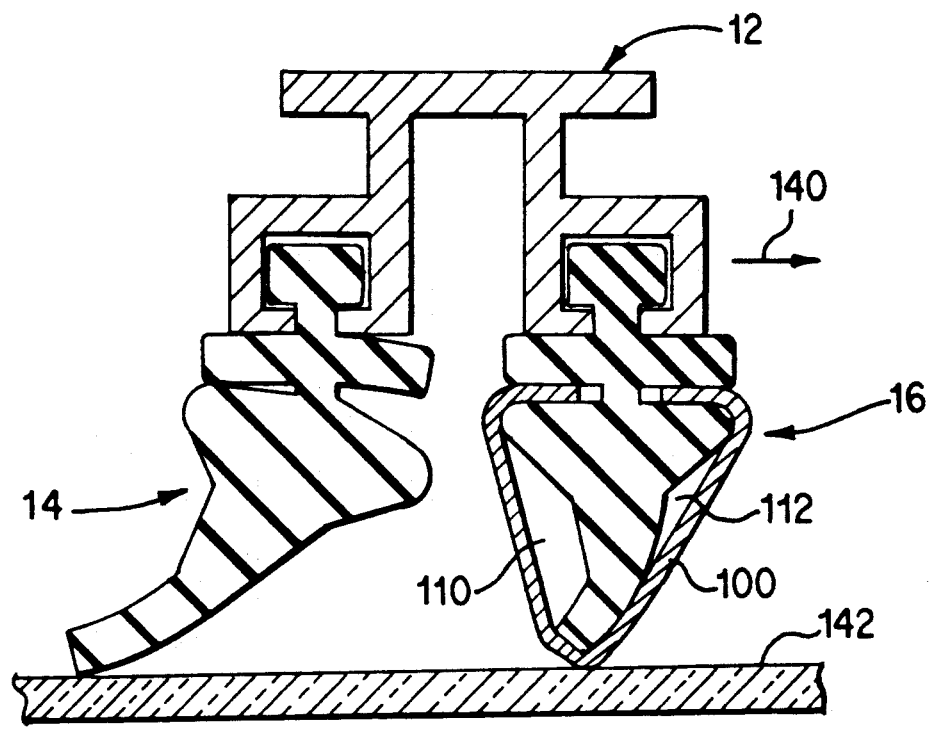
FIGS. 3 and 4 are transverse cross sections of the embodiment of FIG. 1 showing the configuration of the wiper assembly during operation.

More specifically, the scrubbing blade 16, like the wiping blade 14, includes a T-shaped attachment portion 72 received by the channel 34, a horizontal flange 74 and a cleaning or scrubbing portion 76 connected by a web 78 to the flange 74. The scrubbing portion 76 includes a relative wide base 80, a relatively narrow tip 82 and converging or tapered sidewalls 84 and 86 connecting the base and tip. The tip has a flat extremity 87. Slots 88 and 90 are defined by the flange 74 and by laterally extending, generally planar shoulder surfaces 92 and 94 on the base of the scrubbing portion. As best seen in FIG. 3 the tip 82 is truncated so that the overall height of the blade 16 is less than that of the blade 14. In accordance with one example, the height of the projecting portion of the scrubbing blade 16, as measured from the lower wall 37 to the tip extremity 87, is about 80 percent of the comparable height of the wiping blade 14.

The scrubbing portion 76 of the blade 16 is enveloped by a woven or braided mesh 100. The mesh 100, in accordance with one example thereof, is a commercially available nylon material sold by Apex Mill under specification D-45. This mesh is about 38 to 40 percent open, that is, it has openings or interstices 102 whose total area amounts to about 38 to 40 percent of the total area of the mesh. The interstices 102 are generally oval and it has been found that for the most effective cleaning of the windshield, the longer dimension of the oval should be parallel to the longitudinal direction of the blade.

The mesh 100 has edge margins 104 and 106 tucked into the slots 88 and 90, respectively, and held in place by appropriate securing means such as adhesive injected into the slots. Because the slots 88 and 90 are disposed above the windshield and the adhesive is for the most part concealed within the slots, the exposure of the adhesive to the dissolving action of wiper fluids and the like is minimized.

The mesh 100 is attached to the scrubbing blade under slight tension, and the mesh, the base 80, the tip 82 and the tapered side walls 84, 86 of the scrubbing portion 76 define passages or channels 110 and 112 for receiving the debris removed by the mesh and for transporting it, under the flushing action of wiper fluid, for example, toward the hub of the wiper arm. In this fashion, debris does not continue to accumulate in the interstices of the mesh which would otherwise eventually clog the mesh and impair its cleaning action.

As seen in FIG. 1, the ends 120 and 122 of the mesh of the first embodiment are wrapped around and adhesively bonded to the ends of the scrubbing blade 16. The rectangular channels 28 and 34 are crimped at one extremity at the points 124 and 126 to retain the refills and prevent them from sliding out of the ends of the channels. Moreover, a clip 128 at the other end of the assembly 10 locks the blades 14 and 16 in place and retains the assembly 10 in a conventional manner by means of barbed ends 130 forming part of the clip.

Figure 4:
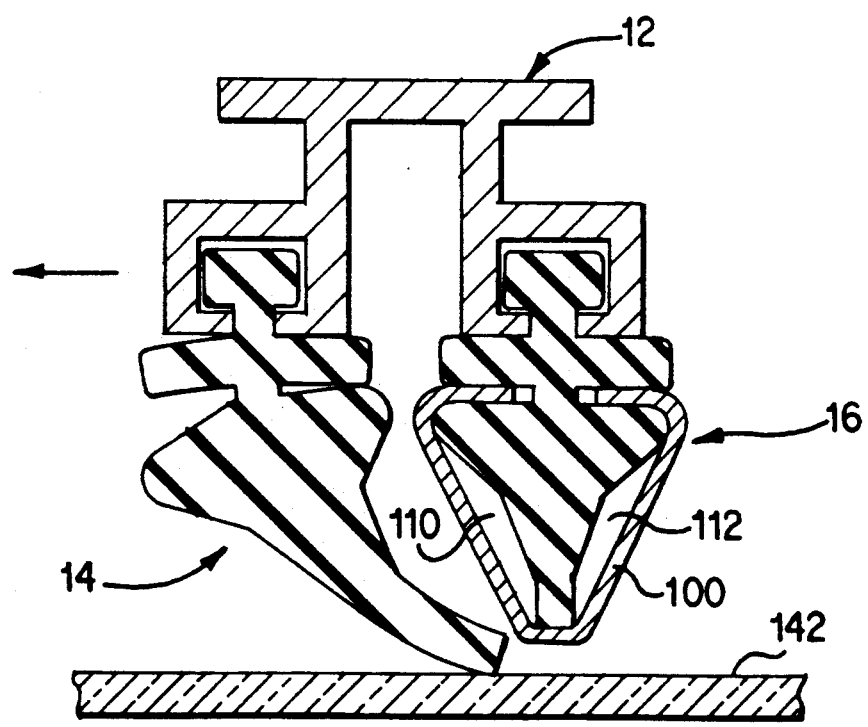

With reference to FIGS. 3 and 4, in the operation of the invention described so far, as the wiper assembly 10 moves in a direction (indicated by the arrow 140 in FIG. 3) in which the scrubbing blade 16 leads the wiping blade 14, both blades are in contact with the windshield 142 and the trailing wiping blade 14 clears the windshield behind the scrubbing blade 16. When the assembly moves in the other direction (FIG. 4), because the scrubbing blade 16 is shorter than the wiping blade 14, it is lifted out of contact with the windshield 142 during this portion of the operating cycle. It will be seen that the wiping blade 14 is at all times in contact with the windshield thereby eliminating streaking. Moreover, it will be evident that the cross sectional areas if the channels 110 and 112 change somewhat during operation. In the direction of motion depicted in FIG. 3, the channel 110 is larger than the channel 112 while in the portion of the cycle depicted in FIG. 4, the channel sizes are approximately the same. The flexing action further helps to clear the channels 110, 112 of accumulated debris by helping to dislodge the debris from the mesh and enhancing the flushing action provided by the wiper fluid. Also, the flexing of the mesh during the wiper cycle reduces ice buildup on the mesh, in a manner analogous to the operation of aircraft de-icing boots.

Figure 5:
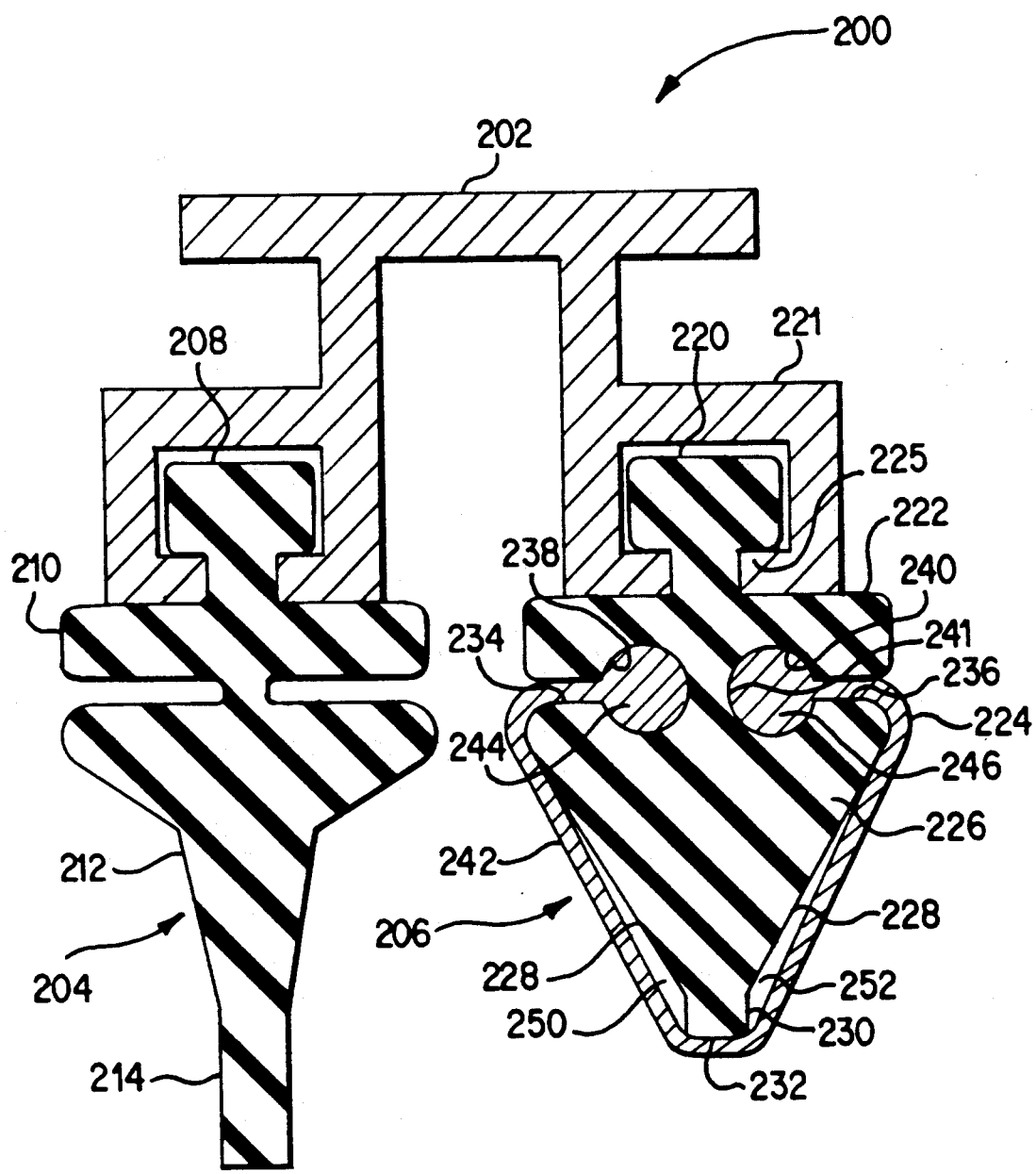
FIG. 5 is a typical transverse cross section of an alternative embodiment of the present invention.
Figure 6:
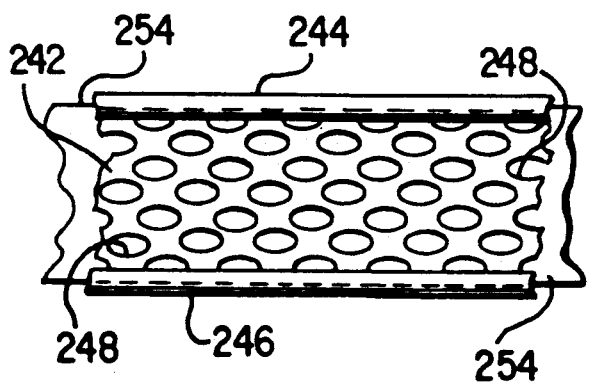
FIG. 6 is a top plan view of a portion of a beaded mesh which may be utilized in connection with the alternative embodiment of FIG. 5.
Figure 7:
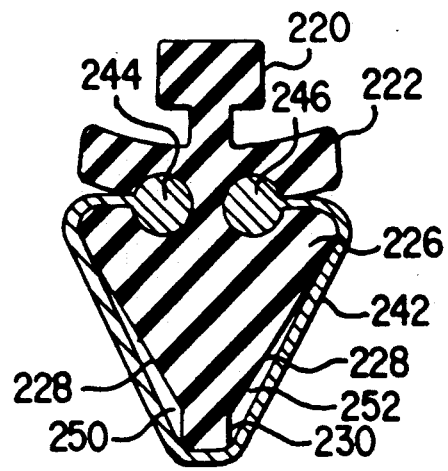
FIG. 7 is a typical transverse cross section of the scrubbing blade of the embodiment of FIG. 5 prior to its installation.

Turning to now FIGS. 5-7, there is shown an alternative embodiment 200 of the invention also comprising a blade support in the form of a two-channel backing extrusion 202, a wiping blade 204 and a scrubbing blade 206. In this embodiment, the cross sectional shape of the scrubbing blade 206 is not the same as that of the wiping blade 204 and the manner of securing the mesh in this embodiment avoids the use of adhesive entirely.

More specifically, the wiping blade 204, as in the first embodiment, is a standard "refill" including a T-shaped attachment portion 208 received by one of the channels of the backing extrusion 202, a flange 210 and a wiping portion 212 having a tip 214.

The scrubbing blade 206 includes a T-shaped attachment portion 220 received by the other channel 221 of the backing extrusion, a flange 222 and a scrubbing portion 224. The channel 221 includes a slotted lower wall 225. The scrubbing portion 224 has a generally triangular base 226 with sides 228 tapering inwardly to a short, generally rectangular tip 230 having a flat extremity 232. The flange and base define between them a pair of slots 234 and 236 terminating at their inner ends in longitudinally extending, enlarged bores 238 and 240. Separating the bores is a web 241 providing limited flexibility.

The bores 238 and 240 have a diameter substantially larger than the height of the slots 234 and 236.

Enveloping the scrubbing portion 234 of the scrubbing blade is a mesh 242 of the kind already described. The mesh 242, details of which are shown in FIG. 6, includes edge beads 244 and 246 having a diameter slightly larger than that of the bores 238 and 240. Thus, when the beaded edges of the mesh are inserted in the bores 238 and 240, they tend to bend the portions of the flanges 222 away from the base 226 as best seen in FIG. 7 which shows the scrubbing blade prior to installation in the blade support 202. Once installed in the channel of the support 202, the lower wall 225 of the channel 221 tends to force the flange 222 back toward the base, that is, toward the unflexed position of the flange, thereby enhancing the bead interlock feature and providing resistance to any tendency of the mesh beads 244, 246 to be pulled out of the bores 238, 240 during use of the blade assembly. An advantage of this embodiment is that the flexibility of the blade, that is, its ability to readily conform to the curvature of the windshield, is not impaired. This advantage is made possible by the ability of the beads to move in a longitudinal direction relative to the bore walls.

The tapering side walls 228 of the base 226, the projecting tip 230 and the mesh 242 define passages or channels 250 and 252 tending to prevent clogging of the mesh with debris and facilitating the clearing of the debris from the blade, as already described.

The beads 244 and 246 may be formed along the edges of the mesh employing a standard beading operation utilizing 3, 4 or 5 thread purl stitching. A hard finish nylon thread for the bead is preferred as it provides for and maintains a more uniform, rounded bead than cotton thread and does not deform as readily. Furthermore, the harder bead provided by nylon thread increases friction between the beads 244 and 246 and corresponding bore walls and makes it more difficult to extract the bead from the bore.

As is well known, the diameter of the bead is controlled principally by the thread tension and the number of threads. Further, to increase the uniformity and strength of the bead, the bead may be formed about a core comprising monofilament line (fishing line) 254, as shown in FIG. 6.

The shape of the base of the scrubbing portion 224 as well as the shape of the tip 230 may be other than that specifically shown in FIG. 5. For example, the extremity 232 of the tip 230 may be rounded and the side walls 228 of the base instead of being planar may be concave.

In the embodiment under consideration, the relative heights of the blades 204 and 206 are such that the height of the portion of the scrubbing blade 206 below the lower wall 225 is about 80 percent of the corresponding height of the wiping blade 204. Although those with skill in the art will appreciate that other relative heights may be employed, it should be noted that if the scrubbing blade is too short relative to the wiping blade, the scrubbing action of the scrubbing blade will be impaired. On the other hand, if the scrubbing blade is too tall relative to the wiping blade, there will be a tendency for streaking to occur as a result of the scrubbing blade remaining in contact with the windshield at all times and the wiping blade being lifted away from the windshield during at least part of the wiper arm cycle.

As in the first embodiment, the mesh 242 has generally elliptical or oval apertures 248 which are preferably oriented with their long direction parallel to the longitudinal direction of the scrubber blade.

Figure 8:
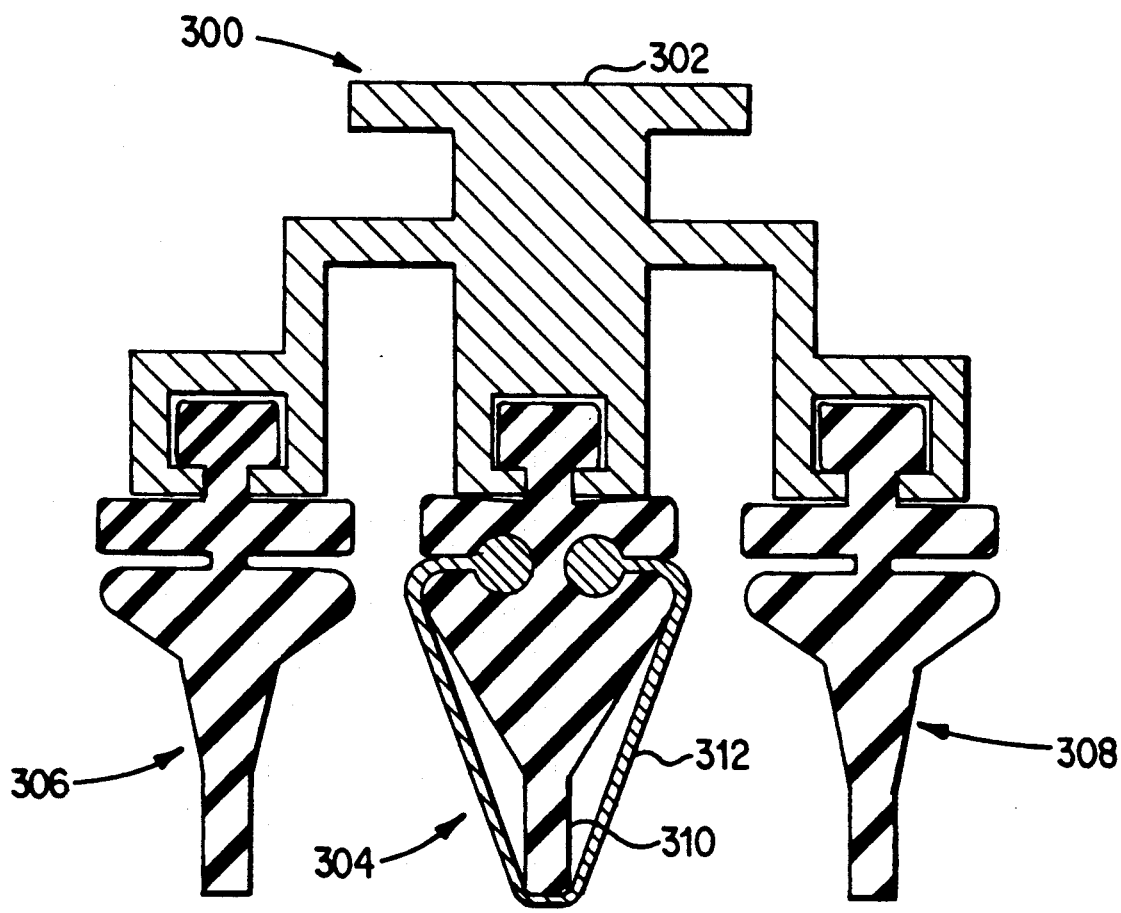
FIG. 8 is a typical transverse cross section of another alternative embodiment of the present invention employing two wiping blades in conjunction with a single scrubbing blade.

FIG. 8 shows a three-bladed version 300 of the present invention. The wiper assembly 300 includes a three channel, flexible plastic blade support or backing extrusion 302 carrying a scrubbing blade 304 flanked by a pair of wiping blades 306 and 308 disposed parallel with and equidistant from the scrubbing blade 304. The wiping blades 306 and 308 are preferably identical to the wiping blade 204 shown in FIG. 5, while the scrubbing blade 304, which includes a tip 310 and a scrubbing mesh 312, is identical to the scrubbing blade 206 of FIG. 5 except that the tip 310 is lengthened so that the overall height of the blade 304 is substantially the same as that of the wiping blades 306 and 308. In the three bladed embodiment of FIG. 8, it is not necessary to shorten the scrubbing blade relative to the wiping blades because irrespective of the direction of travel of the wiper arm carrying the assembly 300, either one or the other of the wiping blades 306, 308 will trail the scrubbing blade 304 so that streaking is avoided.

It is course, to be understood that the present invention is not limited to the specific embodiments described herein but also comprises any modifications and equivalents within the scope of the appended claims. For example, the three-blade embodiment may be modified to incorporate an additional scrubber blade between the flanking wiping blades thereby forming a four-bladed structure. Moreover, various types of known blade elements, such as ice removal blades or those having bristle brushes to help sweep away snow, may be added to the various scrubbing and wiping blade assemblies described herein. Further, for vehicles having flat windshields, the blade support need not be flexible.

What is claimed is:

1. A windshield scrubbing and wiping blade assembly for removing debris from a windshield, said assembly being adapted to be connected to a windshield wiper arm, the blade assembly comprising:

an elongate blade support adapted for connection to the windshield wiper arm;

an elongate scrubbing blade attached to the blade support and having a scrubbing portion, the scrubbing portion including a base and a tip projecting from the base, and the scrubbing blade, including a scrubbing mesh capable of passing debris therethrough, said mesh enveloping the base and a tip, the base and tip having side walls which are spaced from the mesh to define, with the mesh, elongate channels which extend along the length of the scrubbing blade for receiving and transporting, along the length of the scrubbing blade, any debris which passes from the windshield and through the mesh into the channels; and at least one elongate wiping blade attached to the blade support, the at least one wiping blade being disposed parallel to and spaced apart from the scrubbing blade, whereby during operation of the windshield wiper arm the scrubbing blade mesh scrubs said windshield to remove debris therefrom and the at least one wiping blade clears the windshield of the debris during at least a portion of the wiper arm cycle.

2. A blade assembly, in accordance with claim 1, in which:

the scrubbing blade has a height that is less than the height of the wiping blade, whereby during operation of the wiper arm in one direction, the scrubbing blade is in contact with the windshield and the wiping blade clears the windshield behind the scrubbing blade, and during operation of the wiper arm in the other direction, the scrubbing blade is out of contact with the windshield.

3. A blade assembly, in accordance with claim 1, which includes:

two elongate wiping blades, one disposed on each side of the scrubbing blade in spaced, parallel relationship therewith.

4. A blade assembly, in accordance with claim 1, in which:

the side walls of the base are substantially planar and the blade tip has parallel sides and a flat extremity.

5. A blade assembly, in accordance with claim 1, in which:

the mesh is mounted about the scrubbing portion under tension.

6. A blade assembly, in accordance with claim 1, in which:

the blade assembly has only one said elongate wiping blade and the elongate wiping blade has a tip; and the tip of the wiping blade extends sufficiently beyond the tip of the scrubbing blade so that during operation of the wiper arm in one direction, the scrubbing blade is in contact with the windshield and the wiping blade wipes the windshield behind the scrubbing blades, and during operation of the wiper arm in the other direction, the scrubbing blade is out of contact with the windshield.

7. A blade assembly, in accordance with claim 6, in which:

the side walls of the base are substantially planar and the scrubbing blade blade tip has parallel sides and a flat extremity.

8. A blade assembly, in accordance with claim 7, in which:

the mesh is mounted about the scrubbing portion under tension.

9. A blade assembly, in accordance with claim 6, in which:

the mesh has edge margins and said scrubbing portion has means for receiving said edge margins and mechanically locking said margins in place.

10. A windshield scrubbing and wiping blade assembly adapted to be connected to a windshield wiper arm, the blade assembly comprising:

a blade support adapted for connection to the windshield wiper arm;

an elongate scrubbing blade attached to the blade support and having a scrubbing portion, the scrubbing portion including a base and a tip projecting from the base, the base having side walls converging toward the tip, the scrubbing blade including a scrubbing mesh enveloping the base and tip, said mesh having edge margins; and at least one wiper blade attached to the blade support, the at least one wiping blade being disposed parallel to and spaced apart from the scrubbing blade, whereby during operation of the windshield wiper arm the scrubbing blade mesh scrubs said windshield to remove debris therefrom and the at least one wiping blade clears the windshield of the debris during at least a portion of the wiper arm cycle, wherein:

the scrubbing blade further includes an attachment portion for connecting the scrubbing blade to the blade support, the attachment portion being connected to the base by a central web, the scrubbing blade further including a pair of flange portions projecting laterally from said web, the base having bilaterally extending shoulders confronting said flange portions, each said shoulder and flange portion defining a slot between them for receiving an edge margin of the mesh.

11. A blade assembly, in accordance with claim 10, in which:

the edge margins of said mesh are adhesively secured within the spaces defined by the base shoulders and flanges.

12. A blade assembly, in accordance with claim 10, in which:

said scrubbing portion has means for receiving said edge margins and mechanically locking said margins in place.

13. A blade assembly, in accordance with claim 12, in which:

each flange portion and corresponding shoulder of the base define a longitudinally extending bore larger than the slot between said flange and shoulder, and the edge margins of said mesh include beads extending the length of said mesh, each bead being received by one of the bores to secure the mesh.

14. A blade assembly in accordance with claim 13, in which:

the beads are larger than the bores.

15. A windshield scrubbing and wiping blade assembly, for removing debris from a windshield, said assembly being adapted to be connected to a windshield wiper arm, the blade assembly comprising:

a blade support adapted for connection to the windshield wiper arm;

an elongate scrubbing blade attached to and extending from the blade support and having a scrubbing portion, the scrubbing portion including a base and a tip projecting from the base, the base having side walls converging toward the tip, the scrubbing blade including a mesh capable of passing debris therethrough, said mesh enveloping the base and tip, the tip having an extremity, said mesh having edge margins; and a wiping blade attached to and extending from the blade support, the wiping blade being disposed parallel to and spaced apart from the scrubbing blade and including a tip having an extremity, the distance from the blade support to the extremity of the scrubbing blade tip being less than the distance from the blade support to the extremity of the wiping blade tip whereby during operation of the wiper arm in one direction, the scrubbing blade is in contact with the windshield and the wiping blade clears the windshield behind the scrubbing blade, and during operation of the wiper arm in the other direction, the scrubbing blade is out of contact with the windshield, and in which:

the scrubbing blade further includes an attachment portion for connecting the scrubbing blade to the blade support, the attachment portion being connected to the base by a central web, the scrubbing blade further including a pair of flange portions projecting laterally from said web, the base having bilaterally extending shoulders confronting said flange portions, each said shoulder and flange portion defining a slot between them for receiving an edge margin of the mesh.

16. A blade assembly, in accordance with claim 15, in which:
the mesh, the side walls of the base and the tip of the scrubbing blade define channel means for receiving and transporting debris removed from the windshield.

17. A blade assembly, in accordance with claim 15, in said scrubbing portion has means for receiving said edge margins and mechanically locking said margins in place.

18. A blade assembly, in accordance with claim 15, in which:
the side walls of the scrubbing blade base are substantially planar and the scrubbing blade tip has parallel sides and a flat extremity.

19. A blade assembly, in accordance with claim 15, in which:
the mesh is mounted about the scrubbing portion under tension.

* * * * *